United States Patent
Tomita et al.

[11] Patent Number: 6,116,866
[45] Date of Patent: Sep. 12, 2000

[54] REED VALVE FOR A PUMP

[75] Inventors: Tomonobu Tomita, Kanagawa-ken; Atsushi Tanaka, Mie-ken, both of Japan

[73] Assignee: Kasei Optonix, Ltd., Tokyo, Japan

[21] Appl. No.: 09/012,912

[22] Filed: Jan. 23, 1998

[30] Foreign Application Priority Data

Jan. 30, 1997 [JP] Japan .................................. 9-016487

[51] Int. Cl.$^7$ .................................................. F04B 43/00
[52] U.S. Cl. ...................... 417/413.2; 137/855; 137/856; 417/566
[58] Field of Search ................................ 417/413.2, 566; 137/855, 856

[56] References Cited

U.S. PATENT DOCUMENTS

| | | | |
|---|---|---|---|
| 3,191,618 | 6/1965 | McKim | 137/855 |
| 5,249,939 | 10/1993 | Takahashi | 417/566 X |
| 5,564,911 | 10/1996 | Santa | 417/566 X |

FOREIGN PATENT DOCUMENTS

| | | | |
|---|---|---|---|
| 59-200080 | 11/1984 | Japan | 417/413.2 |
| 63-312578 | 12/1988 | Japan | 137/855 |
| 3-149370 | 6/1991 | Japan | 417/413.2 |

*Primary Examiner*—Tony M. Argenbright
*Attorney, Agent, or Firm*—Greenblum & Bernstein, P.L.C.

[57] ABSTRACT

A reed valve is disclosed for use with a pump having a casing. A check valve unit is provided within the casing for preventing counterflow of fluids to be carried. A suction port communicates with a suction line into which the fluids to be carried flow, and a discharge port communicates with discharge line from which the fluids to be carried out are discharged. Reed valves are mounted on the suction port and on the discharge port of the check valve, respectively, in such a manner that the reed valves cover the suction port and the discharge port so as to be able to open and close. Each reed valve includes a first reed valve and second reed valve. The first reed valve is made of pliable material, and is formed to have a size capable of covering the entire respective suction port and discharge port. The second reed valve is smaller than first reed valve and is superposed on the first reed valve to engage the first reed valve such that the first reed valve can open and close, while enhancing sealability thereof.

22 Claims, 3 Drawing Sheets

REED VALVE FOR A PUMP

BACKGROUND OF THE INVENTION

1. Field of the Invention

The present invention relates to a reed valve used primarily for a check valve of diaphragm-type pump, and particularly to a reed valve for a pump in which the structure of the reed valve is improved to have good sealability and increased discharge pressure.

2. Description of Background Information

In a diaphragm-type pump, the amount of fluid discharged per unit discharge operation is generally small, about 0.5 cc. Therefore, when a self-suction force, such as a suction force of fluids under the condition where the pump is not primed and a discharge force (discharge pressure) needs to be generated, the sealability of a portion of check valve becomes important to pumping. However, conventional reed valves used for diaphragm-type pumps have disadvantages in that the sealability thereof is insufficient and thus the discharge pressure and discharge quantity are low, resulting in poor pump performance.

Thus, heretofore, in order to increase the sealability of a reed valve, umbrella-type check valves made of pliable material such as rubber were arranged on the suction port and the discharge port outside the reed valves. However, when a polar solvent such as ketone is one of the fluids to be carried by the pump, a rubber valve is apt to deteriorate, so that fluids to be carried by pumps having such valves are limited to only certain fluids. On the other hand, it is difficult to form an umbrella-type valve of material having chemical resistance.

SUMMARY OF THE INVENTION

Accordingly, it is an object of the present invention to provide a reed valve for a pump, and particular, in which the reed valve is utilized in a diaphragm-type pump having good sealability of a portion of check valve, and where the fluids to be carried by the pump are not limited to any particular type fluid.

In order to fulfill the above-mentioned object, in accordance with a first aspect of the present invention, a pump is disclosed, wherein the pump is of the type that includes a casing, and a check valve unit mounted within the casing, for preventing counterflow of fluids to be carried. The check valve unit has a suction port which communicates with a suction line, and into which the fluids to be carried flow. A discharge port is provided which communicates with a discharge line, and from which the fluids to be carried are discharged. Reed valves are mounted on the suction port and on the discharge port of the check valve in such a manner that the reed valves cover the suction port and the discharge port in order to open and close the respective port. Each reed valve is formed by a first reed valve and a second reed valve. The first reed valve is made of a pliable material, and is formed to have a size capable of entirely covering, respectively, each of the suction port and the discharge port, and the second reed valve is superposed on the first reed valve to engage the first reed valve in such a manner that the first reed valve can open and close. Accordingly, the sealability of the above-mentioned reed valve for the pump of the present invention is enhanced.

In accordance with a second aspect of the present invention, the second reed valve has a size capable of partially covering, respectively, each of the suction port and the discharge port.

According to another aspect of the pump and reed valve of the present invention, the opening and closing action of the first reed valve is smoother due to the use of the second reed valve in conjunction therewith, so that the sealability of reed valve is improved.

In accordance with a further aspect of the present invention, a portion of the check valve carrying the reed valve curves toward the direction of flow of fluids to be carried.

According to another aspect of the present invention, the opening and closing action of reed valve is smoother, so that the sealability of the reed valve is excellent.

In another aspect of the present invention, the pump equipped with the reed valve is a piezo-electric pump. Additionally, the pump may be a diaphragm-type pump which includes a piezo-electric element as the driving device of pump.

In a further aspect of the present invention, the first reed valve is formed from a pliable resin sheet, for example of tetrafluoroethylene hexafluoropropylene copolymer (FEP) or polytetrafluoroethylene (PTFE), and having a thickness of about 0.02 mm to 0.5 mm.

In accordance with an additional aspect of the present invention, the second reed valve is formed from a relatively stiff resin sheet, for example of polytetrafluoroethylene (PTFE) or tetrafluoroethylene hexafluoropropylene copolymer (FEP), ethylene tetrafluoroethylene copolymer (ETFA) or the like, or a pliable material having a thickness which is equal to or greater than that of the first reed valve, e.g., having a thickness of about 0.05 mm to 1 mm.

In accordance with a further aspect of the present invention, a valve holder is provided on the second reed valve to hold the first and second reed valves so that the first and second reed valves can open and close.

Accordingly, the sealability and the opening and closing performance of the reed valve is greatly improved.

BRIEF DESCRIPTION OF THE DRAWINGS

The objects and advantages of the present invention will be better understood from the following description, with reference to the accompanying drawings in which.

DETAILED DESCRIPTION OF THE PREFERRED EMBODIMENTS

Figure 1:
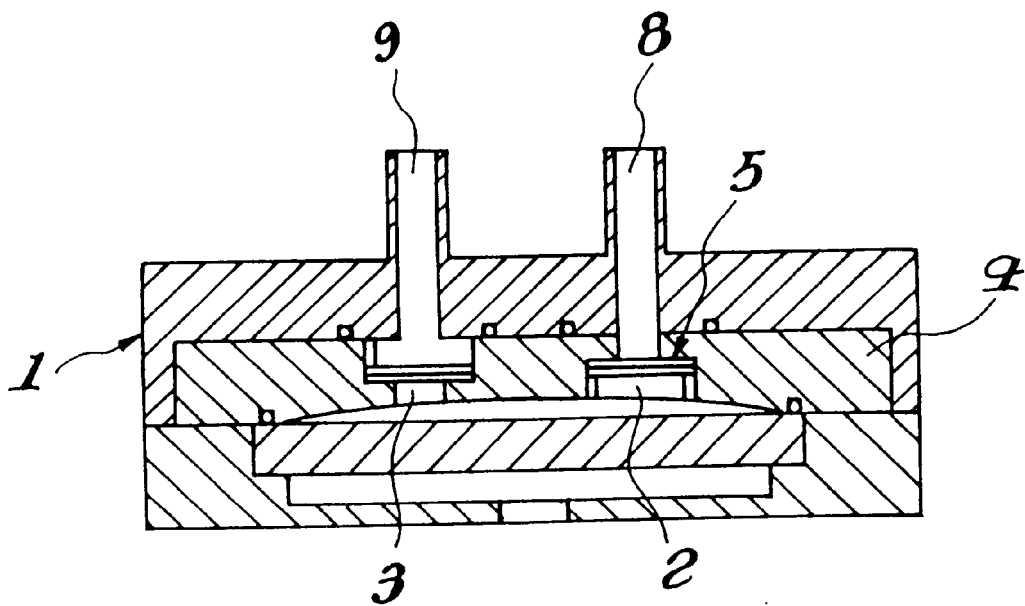
FIG. 1 is a vertical sectional view of a first embodiment of a reed valve for a pump of the present invention, which is depicted as a diaphragm-type pump.

Referring to the drawings, the embodiments of reed valve for a pump according to the present invention are explained in detail.

A first embodiment of the present invention is shown in FIG. 1 which depicts a diaphragm-type pump that includes a casing 1. The casing 1 is provided therein with a check valve unit 4, which includes a partition wall having suction port 2 that communicates with a suction line 8 and into which fluids to be carried flow, and a discharge port 3 communicates with a discharge line 9, wherein fluids which have flowed through the suction port 2 are discharged from the discharge port 3 to the discharge line 9. Reed valves 5 are mounted on suction port 2 and on discharge port 3 of check valve unit 4, to cover suction port 2 and discharge port 3, respectively.

Figure 2:
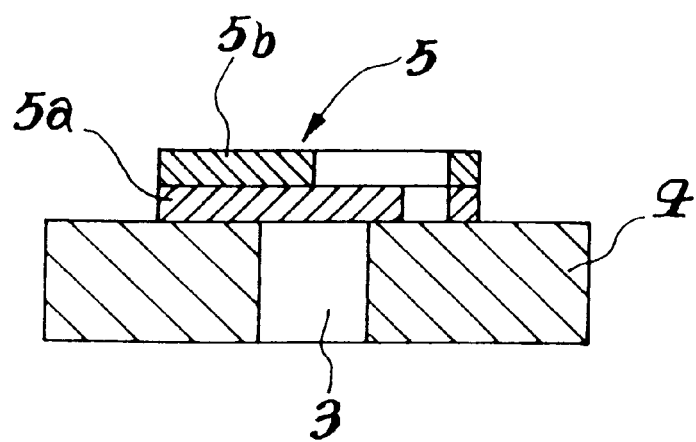
FIG. 2. is a vertical sectional view of a reed valve of the present invention mounted on a discharge port of pump.

As shown in FIG. 2, reed valve 5 of check valve unit 4 is mounted on discharge port 3 and reed valve 5 includes a first reed valve 5a and a second reed valve 5b. FIG. 2 is merely an example, and it is proposed that suction port 2 is also covered by a reed valve 5 in a similar manner to discharge port 3.

Figure 3A:
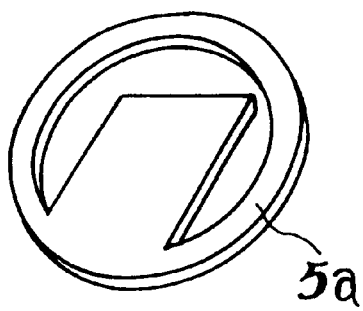
FIGS. 3(a) and (b) are perspective views of the first and second reed valves, respectively.

First reed valve 5a is formed to be of a size which can cover the entire discharge port 3. For example, as shown in FIG. 3(a), first reed valve 5a is manufactured by blanking or forming from a circular plate, which is then mounted on discharge port 3 to cover the entire discharge port 3.

Figure 3B:
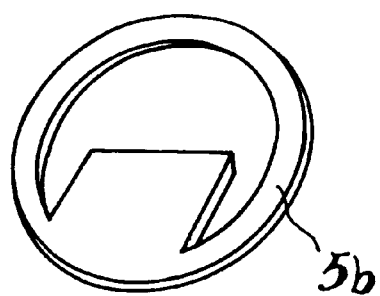
FIG. 3(c) is a perspective view of both the first and second reed valves in superposed relation.
Figure 3C:
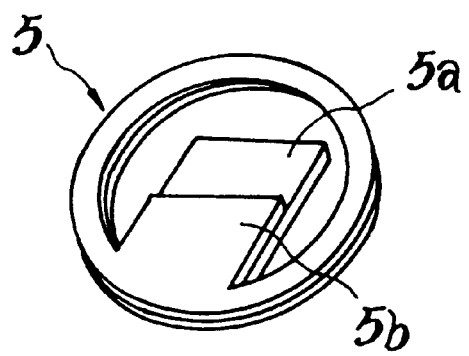

Second reed valve 5b is mounted on first reed valve 5b in such a manner that the first and second valves are placed one upon another, and second reed valve 5b is formed to be shorter than first reed valve 5a. For example, as shown in FIG. 3(b), second reed valve 5b is manufactured by blanking or forming a circular plate in the same manner as the first reed valve 5a, which is superposed on first reed valve 5a, as shown in FIG. 3(c). In this manner, discharge port 3 is covered by first reed valve 5a which covers the entire discharge port 3 and second reed valve 5b partially covers discharge port 3. Second reed valve 5b is superposed on first reed valve 5a, so that the sealability of the reed valve can be increased. In this way, by forming the reed valve from two superposed reed valves, the sealability of reed valve is enhanced as compared with a single reed valve. Further, by forming second reed valve 5b such that the second reed valve 5b partially covers discharge port 3, smooth discharge of fluids takes place as reed valve 5 opens to allow fluid to flow out.

By way of example, the materials of first reed valve 5a are preferably relatively thin and pliable. Further, from the point of chemical resistance of fluids to be carried, it is preferable to use resin sheets of tetrafluoroethylene hexafluoropropylene copolymer (FEP), polytetrafluoroethylene (PTFE) or the like as materials for the first reed valve 5a. The thickness thereof, which depends on its use, is preferred to be about 0.02 mm to 0.5 mm. On the other hand, second reed valve 5b has a preferred thickness which is substantially equal to thickness of first reed valve 5a when the second reed valve 5b is made of relatively stiff resin sheets. However, when the second reed valve 5b is made of relatively pliable materials, it is formed to have a thickness greater than that of first valve 5a. For example, it is preferred to use resin sheets of polytetrafluoroethylene (PTFE), tetrafluoroethylene hexafluoropropylene copolymer (FEP), ethylene tetrafluoroethylene copolymer (ETFA) or the like as materials for second reed valve 5b. The thickness thereof, which also depends on its use, is preferred to be greater than the thickness of first reed valve 5a, and preferably about 0.05 mm to 1 mm.

In this manner, materials of reed valve 5 have chemical resistance, wherein the first reed valve 5a is made of pliable and thin materials, while second reed valve 5b is made of relatively stiff materials, or in the case of the second reed valve being pliable, second reed valve 5b is made to be thicker than first reed valve 5a. Accordingly, since reed valve 5 is not deteriorated by fluids to be carried, and further, since second reed valve 5b has a stiffness greater than first reed valve 5a, reed valve 5 formed of first reed valve 5a and second reed valve 5b has excellent sealability.

Figure 4:
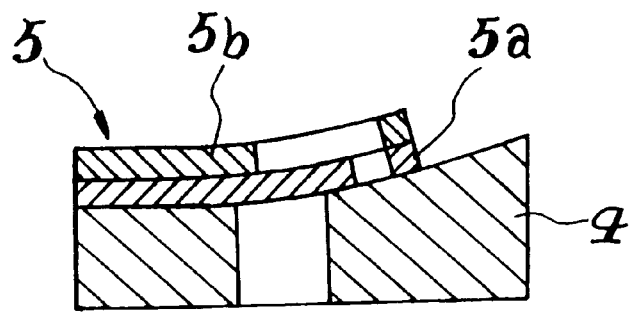
FIG. 4 is a vertical sectional view of a second embodiment of a reed valve for a pump of the present invention.

A second embodiment of the present invention is shown in FIG. 4. As seen in FIG. 4, a portion of valve unit 4 around suction port 3, and/or around discharge port 3, may be curved in the direction of flow of the fluid to be carried. In such a way, by a curve of the surface of a portion of check valve unit 4 equipped with reed valve 5, the first and second reed valves 5a, 5b are curved as shown in FIG. 4 so that opening and closing of first and second valves 5a, 5b is smooth, and the sealability thereof is enhanced.

Figure 5:
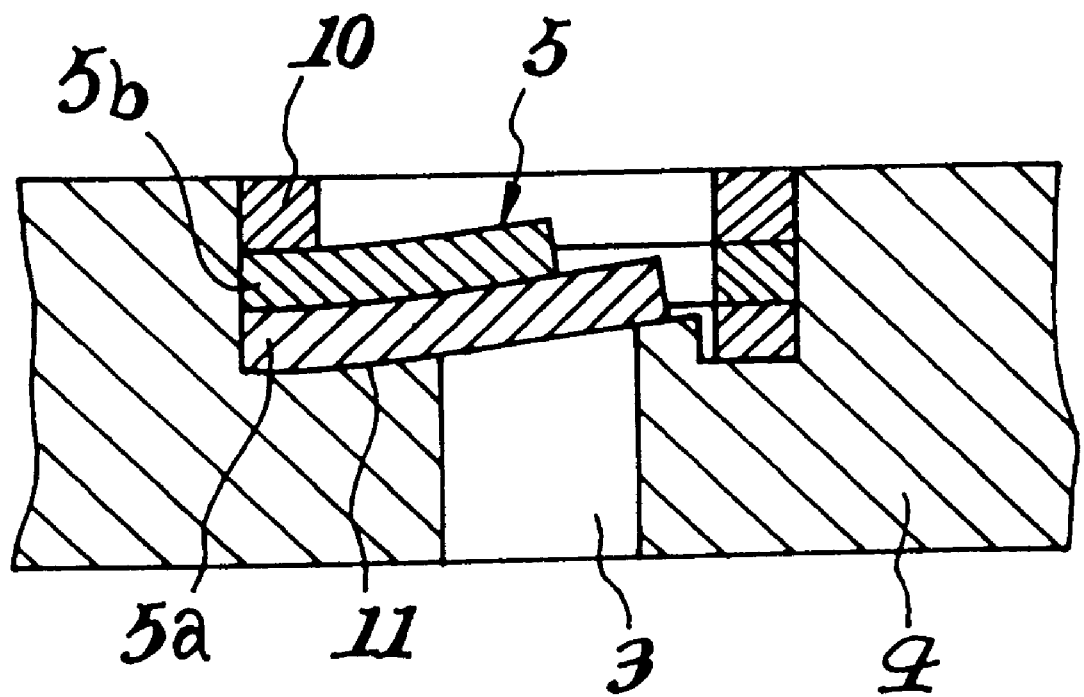
FIG. 5 is a vertical sectional view of a third embodiment of a reed valve for a pump of the present invention.

According to the third embodiment of the present invention as shown in FIG. 5, the portion of check valve unit 4 that receives reed valve 5 may have a recessed area 11 having a curved surface that inclines in a direction of the flow of fluid to be carried, first and second reed valves 5a, 5b engage along the curved surface of the portion of check valve unit 4 to cover discharge port 3, with second reed valve 5b being held in position by a valve holder 10 mounted on the second reed valve 5b. Valve holder 10 (as seen in FIG. 5) does not cover discharge port 3. By such a structure, a reed valve can be constructed to have good opening and closing characteristics and good sealability. Further, since reed valve 5 is mounted within recessed area 11, reed valve 5 does not project from the check valve unit 4 during operation.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

The present disclosure relates to subject matter contained in priority Japanese Application No. HEI-9-16487, filed on Jan. 30, 1997, which is herein expressly incorporated by reference in its entirety.

What is claimed:

1. A reed valve in combination with a casing, comprising:
   a casing;
   a check valve unit, for preventing counterflow of fluids to be carried, mounted within the casing, said check valve unit having a suction port which communicates with a suction line into which fluids to be carried flow, and a discharge port which communicates with a discharge line from which the fluids to be carried are discharged;
   reed valves mounted respectively on the suction port and on the discharge port of said check valve unit in such a manner that said reed valves cover the suction port and the discharge port so as to be able to open and close;
   wherein each reed valve comprises a first reed valve and second reed valve, said first reed valve being made of a pliable material, and formed to have a such a size that it is capable of covering the entire suction port and discharge port, respectively, and said second reed valve is superposed on said first reed valve to engage said first reed valve in such a manner that said first reed valve can open and close.

2. The reed valve and casing combination recited in claim 1, wherein said second reed valve has a size capable of partially covering a respective one of said suction port and said discharge port when superposed on the first reed valve.

3. The reed valve and casing combination recited in claim 1, wherein a portion of said check valve unit equipped with the reed valve curves toward the direction of flow of fluids to be carried.

4. The reed valve and casing combination recited in claim 1, wherein said first reed valve is formed from a pliable resin sheet having a thickness of about 0.02 mm to 0.5 mm.

5. The reed valve and casing combination recited in claim 1, wherein said second reed valve has a thickness which is equal to or greater than that of the first reed valve.

6. The reed valve and casing combination recited in claim 1, wherein a valve holder is provided on said second reed valve to hold said first and second reed valves so that the first and second reed valves can open and close.

7. The reed valve and casing combination recited in claim 1, wherein the said second reed valve has a thickness of about 0.05 mm to 1 mm.

8. The reed valve and casing combination recited in claim 5, wherein said second reed valve has a thickness of about 0.05 mm to 1 mm.

9. The reed valve and casing combination recited in claim 1, wherein said first reed valve is formed from a pliable resin sheet.

10. The reed valve and casing combination recited in claim 9, wherein said pliable resin sheet is selected from one of tetrafluoroethylene hexafluoropropylene copolymer (FEP) and polytetrafluorethylene (PTFE).

11. The reed valve and casing combination recited in claim 10, wherein said first reed valve has a thickness of about 0.02 mm to 0.5 mm.

12. The reed valve and casing combination recited in claim 5, wherein a resin sheet of said second reed valve is selected from one of polytetrafluoroethylene (PTFE), tetrafluoroethylene hexafluoropropylene copolymer (FEP), and ethylene tetrafluoroethylene copolymer (ETFA).

13. The reed valve and casing combination recited in claim 12, wherein said second reed valve has a thickness greater than the thickness of said first reed valve.

14. The reed valve and casing combination recited in claim 13, wherein said second reed valve has a thickness of about 0.05 mm to 1 mm.

15. The reed valve and casing combination recited in claim 1, wherein said casing is a casing for a pump.

16. The reed valve and casing combination recited in claim 15, wherein said pump is a diaphragm pump which includes a piezo-electric element as the driving device for the pump.

17. A check valve unit for preventing counterflow of fluids to be carried, said check valve unit having a suction port which communicates with a suction line into which fluids to be carried flow, and a discharge port which communicates with a discharge line from which the fluids to be carried are discharged;

reed valves mounted respectively on the suction port and on the discharge port of said check valve unit in such a manner that said reed valves cover the suction port and the discharge port so as to be able to open and close;

wherein each reed valve comprises a first reed valve and second reed valve, said first reed valve being made of a pliable material, and formed to have a such a size that it is capable of covering the entire suction port and discharge port, respectively, and said second reed valve is superposed on said first reed valve to engage said first reed valve in such a manner that said first reed valve can open and close.

18. A reed valve for use with a suction port or a discharge port, comprising:

a first reed valve and second reed valve, said first reed valve being made of a pliable material, and formed to have a size capable of covering the entire suction port or discharge port, respectively, and said second reed valve being formed to have a size capable of partially covering the entire suction port or discharge port, respectively, when superposed on said first reed valve to engage said first reed valve in such a manner that said first reed valve can open and close.

19. The reed valve recited in claim 18, wherein said first reed valve is formed from a pliable resin sheet having a thickness of about 0.02 mm to 0.5 mm.

20. The reed valve recited in claim 19, wherein said second reed valve is made of one of a relatively stiff resin sheet and a pliable resin sheet having a thickness which is equal to or greater than that of the first reed valve.

21. A reed valve for use with a suction port or a discharge port, comprising:

a first reed valve and second reed valve, said first reed valve being made of a pliable material, and formed to have a size capable of covering the entire suction port and discharge port, respectively, and said second reed valve being superposed on said first reed valve to engage said first reed valve in such a manner that said first reed valve can open and close, wherein said first reed valve is formed from a pliable resin sheet having a thickness of about 0.02 mm to 0.5 mm.

22. A reed valve for use with a suction port or a discharge port, comprising:

a first reed valve and second reed valve, said first reed valve being made of a pliable material, and formed to have a size capable of covering the entire suction port and discharge port, respectively, and said second reed valve being superposed on said first reed valve to engage said first reed valve in such a manner that said first reed valve can open and close, wherein said second reed valve is made of one of a relatively stiff resin sheet and a pliable resin sheet having a thickness which is equal to or greater than that of the first reed valve.

* * * * *